INVENTOR
James A. Spencer
BY Charles H. Brown
ATTORNEY

INVENTOR
James A. Spencer
BY Charles H. Brown
ATTORNEY

April 4, 1961 J. A. SPENCER 2,978,676

SELECTIVE SIGNALLING DISPLAY SYSTEM WITH CHECKING AND ACKNOWLEDGMENT

Filed July 24, 1950 3 Sheets-Sheet 3

INVENTOR
James A. Spencer
BY Charles H. Brown
ATTORNEY

United States Patent Office 2,978,676

Patented Apr. 4, 1961

2,978,676

SELECTIVE SIGNALLING DISPLAY SYSTEM WITH CHECKING AND ACKNOWLEDGMENT

James Albert Spencer, Teaneck, N.J., assignor to Radio Corporation of America, a corporation of Delaware Filed July 24, 1950, Ser. No. 175,611

10 Claims. (Cl. 340—154)

The invention pertains to signalling systems and it particularly pertains to automatic signalling systems incorporating checking and acknowledgment provisions for communicating between stations.

In certain widely used communication systems, such as airport-to-aircraft-in-flight, and police and fire protection communication networks, there is need for rapid and accurate intelligence transmitting means incorporating safety features which immediately indicate whether the message transmitted has been received properly.

It is an object of the invention to provide an automatic communication system for transmitting messages between stations and acknowledging receipt thereof together with an indication of the accuracy of the transmission.

It is another object of the invention to provide an automatic signalling system for communicating between a central control station and an individual one or all of a number of subordinate remote stations.

It is a further object of the invention to provide an automatic signalling system incorporating means to request a reply to a previous message and means to condition the system automatically to transmit the reply.

It is still another object of the invention to provide an automatic signalling system wherein an individual one of a number of subordinate stations only will respond to a control station and display the message transmitted by the latter until that subordinate station is again called by the control station.

It is a still further object of the invention to provide an automatic signalling system incorporating means to detect and indicate errors in messages transmitted by a control station and received by a remote station.

These objects and all others that will appear as the specification progresses are attained by pulse communication equipment arranged to transmit a coded signal from a central or control station to a subordinate station, usually referred to by those familiar with the art as the remote station, equipped with complementary code translating equipment. The equipments of the invention preferably operate in conjunction with communication radio telephone equipment already existing for other purposes. The code signal which is to be displayed visually, preferably, consists of a series of ideograms. The ideograms to be selected by the operator of the control equipment are preferably available on a keyboard, consisting of a number of rows of several keys each. An ideogram is shown on the face of each key. The operator selects the ideogram for the message by depressing one key of each of the rows. The control or control station equipment then generates a series of audio frequency tones, which are employed to modulate the output of a transmitter. The modulated carrier is received and demodulated by the subordinate or remote receiver, and the audio-frequency signals and applied to the translating equipment. A translator unit of the translating equipment converts the signals into D.-C. pulses which actuate an indicator unit. The indicator preferably comprises a plurality of drums, each of which has printed on its circumference the same ideograms appearing on the corresponding row of keys on the control keyboard. When a message is received, each drum in the indicator rotates until the ideogram displayed is the same as the ideogram selected on the corresponding row of keys on the control keyboard.

In addition to its primary function of transmitting a signal for visual display the equipment according to the invention is arranged so that the correct receipt of a message by the remote equipment causes an acknowledgment signal to be transmitted to the control station, where the acknowledgment signal may be examined and accepted. A further manual-acknowledgment request message may be transmitted from the control station to the remote station, whereupon a second acknowledgment signal is transmitted, if the operator at the remote equipment has so conditioned the latter in response to the previous signal.

Also, the incorrect receipt of a message by the remote equipment, which might result from interference, jamming, or faulty transmission or reception of the radio-frequency signal, is automatically indicated to the operator at the remote equipment by a visual error symbol appearing on the indicator. In this event, an "error" acknowledgment signal is transmitted by the remote equipment. This error acknowledgment signal is registered by the control equipment, indicating that the proper signal was not received.

In accordance with the invention, the control apparatus can be conditioned so that messages may be sent to any one of a number of remote stations or to all of them simultaneously.

In addition to the communication security inherent in the type of signalling system utilized, further security is provided by a coding plug in the control equipment, which codes or scrambles the message in any one of a large number of possible combinations. The scrambled message can be translated only by remote equipment provided with a coding plug employing exactly the same scrambling combination.

An example of an embodiment according to the invention will be described in detail with reference to the accompanying drawing forming a part of the specification and in which.

*Basic requirements*

Each message to be transmitted over the communication system as contemplated by the apparatus hereinafter described consists of 11 equal time interval groups, although a lesser or greater number of groups can be employed if desired without departing from the invention.

Figure 1:
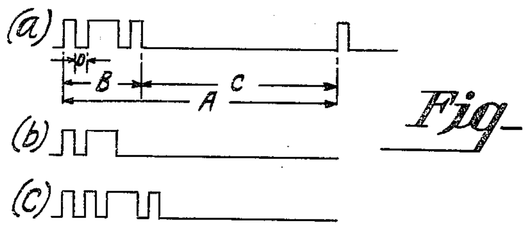
Fig. 1 is a graphical representation of certain code signals employed in practice of the invention.

The first two signal groups in any message determine whether transmission is made to all or but one, and to which, of the remote stations the message is directed. The third signal group, a typical example of which is shown in Fig. 1(*a*) requests, and effectively causes, the remote equipment selected by the first two groups to clear out the previous message on the indicator by the return of the indicator units to the initial or home position. During what would be the fourth signal group, there is no transmission other than the initial mark as shown in Fig. 1(*a*) following the group in order to provide additional time to complete clearing of the previous message.

Each of the following six signal groups constitute the message text and cause the remote station to display the ideograms selected at the control station keyboard.

The eleventh signal group, a typical example of which is shown in Fig. 1(*b*), prepares the remote equipment to transmit in acknowledgment signal, a typical example of which is shown in Fig. 1(*c*), if the message has been correctly received. If the message has been incorrectly received, an error indication signal is transmitted.

A manual acknowledgment request message also consists of 11 signal groups. The first two groups and the last group are identical with the corresponding groups in any other message, but each of the six text groups consists only of the initial mark. The first two station-selection groups are for the same purpose as the corresponding groups in a normal message. The next eight groups have no effect on the message already set up on the remote station display. The acknowledgment-request group causes the remote equipment to transmit the acknowledgment signal, provided the operator has set the manual acknowledgment button in the remote equipment after receiving a correct prior message.

Each signal group of time interval A as shown in Fig. 1(*a*) is divided into two unequal sub-intervals of time, B and C. The first sub-interval B of each signal group is further divided into seven equal time intervals D. The initial element in each signal group is always a mark. This initial mark acts to start the distributor in the remote equipment, in order to synchronize it with the control equipment. Of the remaining six elements in the first subinterval, three are marks and three are spaces. The intelligence of the signal group is conveyed by the order in which these three marks and three spaces are transmitted. (In certain signal groups, all six elements after the initial mark may be spaces.) The second sub-interval C in each signal group consists of a single space of time duration sufficient to permit the remote apparatus to carry out the desired function. This interval is longer than sub-interval B because of inherent apparatus relationships at the central station. The longer time is, however, used to good advantage.

The error-indication and acknowledgment features of the system are made possible by the use of only 20 out of 64 possible code combinations in a signal group. That is, intelligence is conveyed by signal groups consisting only of three marks and three spaces (in addition to the initial synchronizing mark). The use of all 64 code combinations (consisting of from one to six marks) would permit the employment of a greater number of characters, but any error in transmission or reception would result in a false character being received, and no error indication would be possible. While it is possible that a signal group may be distorted by the loss of one or more marks and the substitution of the proper number of spurious marks, this is much less probable than the simple loss or addition of marks due to static, jamming, or faulty transmission or reception.

If more or less than three marks are received in any signal group comprising the message, it is desired that the error be indicated in the remote equipment and an error indication signal automatically transmitted by the remote equipment. The arrangement for accomplishing this result will be described in connection with the description of the apparatus to follow.

*Control station system*

Figure 2:
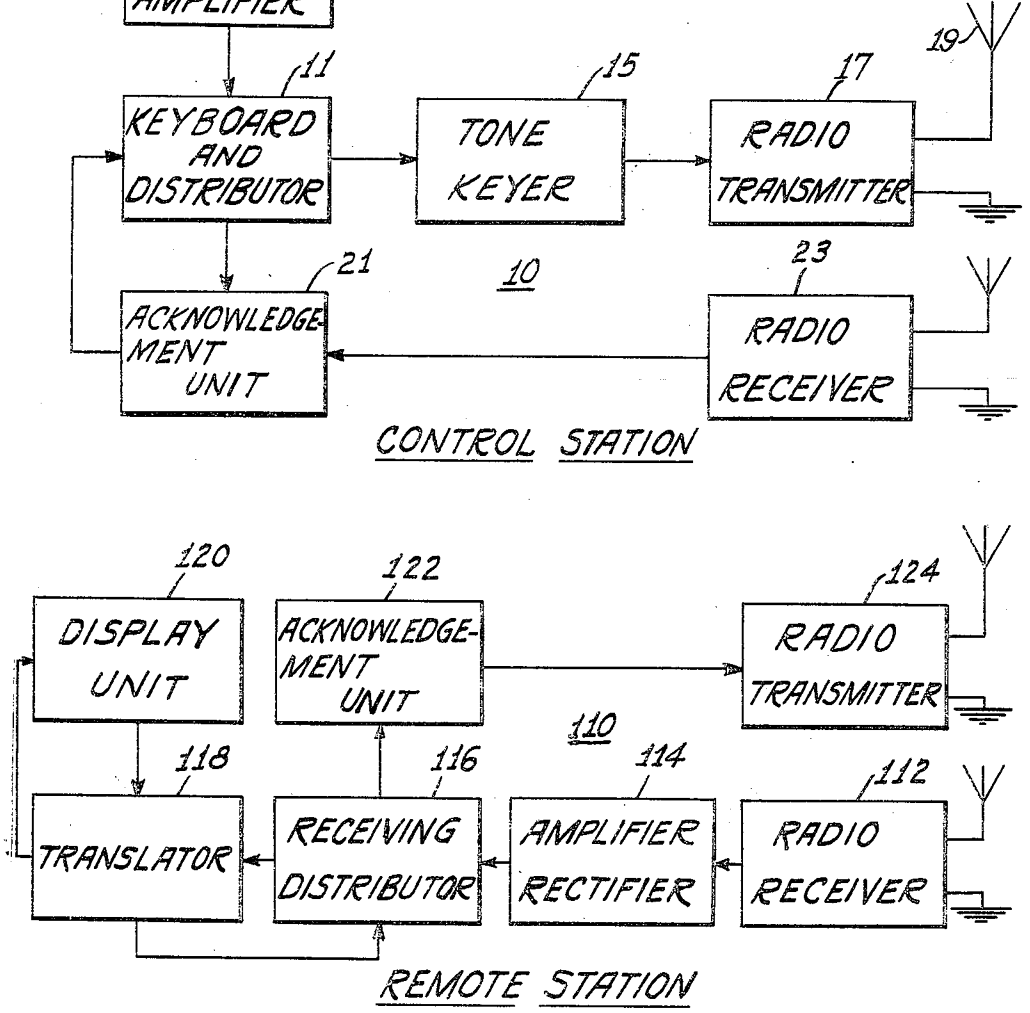
Fig. 2 is a functional diagram of a communication system according to the invention.

Referring to the functional diagram of Fig. 2, at a control station 10, the identity of the remote station desired and the message desired are set up as specific switch positions on the keyboard portion of a keyboard and distributor unit 11 and potentials obtained in accordance with the selections are translated in sequence by the distributor portion of unit 11. The distributor portion of unit 11 preferably is under control of a synchronous drive amplifier 13 of the type shown and described in U.S. Patent 2,483,786 issued October 4, 1949 to E. R. Shenk but may be supplied by any well regulated power source. The distributor portion of unit 11 may be any conventional type of mechanical distributor known to the art or it may be an electronic circuit arrangement capable of performing the equivalent function. One example of such an electronic distributor is described in the specification of copending U.S. patent application of E. R. Shenk, Serial No. 699,191 filed September 25, 1946, issued as U.S. Patent 2,543,874 on March 6, 1951. Output from unit 11 is applied to a conventional tone keyer 15, preferably of the type shown and described in U.S. Patent 2,482,561 issued September 20, 1949 to E. R. Shenk, which modulates a conventional radio transmitter 17 to provide either a two audio-tone modulated or a frequency shift C.W. signal at antenna 19. At the time the message is transferred from the switching elements to the tone keyer 15 an acknowledgment unit 21 is conditioned in proper phase relationship to receive an acknowledgment or error indication signal from the remote station over a conventional radio receiver 23. Details of the circuitry for accomplishing these results at control station 10 will now be given followed by a description of the arrangement at the remote station.

Figure 3:
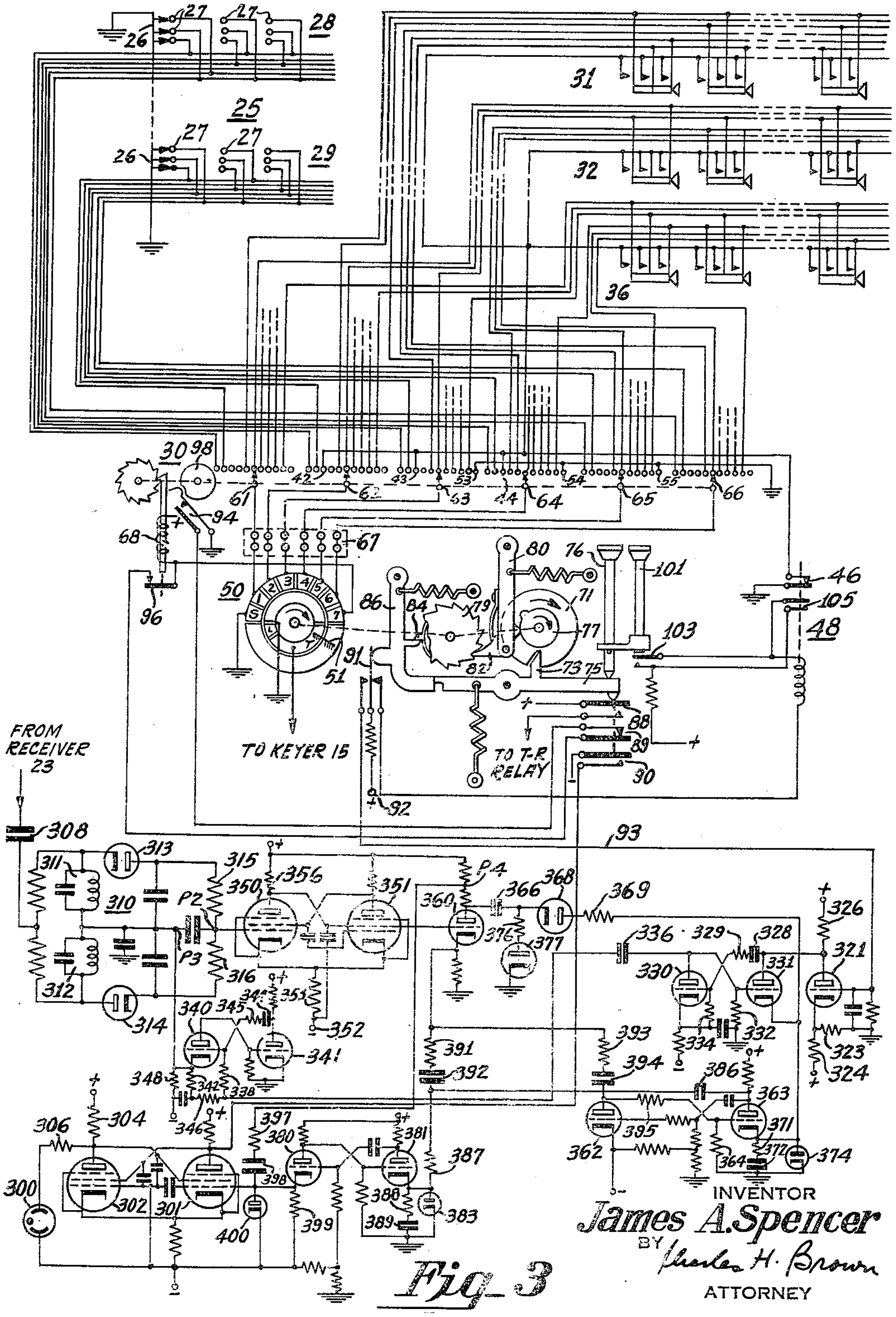
Fig. 3 is a schematic diagram of the arrangement of certain components of the control station shown in Fig. 1.

Referring to Fig. 3, there is shown a schematic diagram of a suggested embodiment of keyboard and distributor unit 11 together with a suggested embodiment of acknowledgment unit 21.

*Keyboard and distributor unit*

The station selector is essentially a two-section, three-pole, 42-position rotary switch 25, of which only three typical positions are shown. Although a rotary switch is used to advantage here, any other type of switch obviously will serve as well. One position is blank. Position zero calls all remote stations simultaneously. Positions Nos. 1 to 40 select remote stations individually. The three stationary contacts 27 of each position of section 28 of the station selector switch 25 are connected to the first contacts of the first three sections of a six section, 11 contact stepping switch 30. The stationary contacts 27 of each position of section 29 of switch 25 are connected to the second contacts of the same sections of switch 30. The three contacts 27 of each position of switch sections 28 and 29 are connected in various combinations to contacts of switch 30 so that no two positions of switch 25 will yield the same combination. Both rotor sections 26 are connected to ground. The position of rotor section 26 then determines the signal-group combination in the first two station-selection groups of the message to be transmitted.

In the third position of each level of stepping switch 30, contacts 42, 43 and 44 are grounded through the contacts 46 of a manual acknowledgment relay 48, later to be more fully described, grounding the corresponding segments of a distributor 50.

The contacts of the fourth position of each level of stepping switch 30 have no connection in order to allow time for certain operations later to be described. The resulting signal group therefore consists of the initial mark followed by spaces.

Each of the succeeding six positions of stepping switch 30 is connected to one of six 11-key message switches 31–36 of which three sections only of 31, 32 and 36 are shown in the interest of clarity.

Each of the six message switches, 31–36, consists of an eleven-section ganged switch. Each section is operated by a key which bears an ideogram. The sections are mechanically interlocked so that normally only one key of the eleven can be depressed. Each section consists of a three-pole, single-throw switch, which when operated connects three of the six contacts on the corresponding section of stepping switch 30 to ground. Each section of a message switch is wired to a different combination of three of the six contacts of the stepping switch section.

Each message switch may also be provided with a latch-bar switch which is closed when any one of the eleven keys of that switch is depressed and the six latch-bar switches connected in series circuit arrangement (not shown) to prevent transmission in the event a switch is not depressed or merely to indicate such condition as is desired.

In the eleventh, or acknowledgment request, position of stepping switch 30 contacts 53, 54 and 55 are grounded directly. It should be understood of course that the particular coding arrangements shown are but examples of possible combinations.

Distributor 50 consists of two concentric metal rings mounted on an insulating base and traversed by brushes 51 displayed 180 degrees from each other and electrically connected together.

Each ring is partially segmented and the segments electrically insulated from one another. Segment "S" is connected to ground; segments (1), (2), (3), (4), (5) and (6) to corresponding arms 61–66 of stepping switch 30, segment (7) to the coil of stepping switch magnet 68, segment "L" to ground, and "T" to the tone keyer 15.

A coding plug 67 is interposed in the circuit between the stepping switch and the distributor to change the coding of the equipment by scrambling the sequence in which the marks and spaces of each signal group are sent. Unscrambling is provided for by a corresponding code plug in the remote equipment. As shown, plug 67 is arranged for non-scrambled transmission.

Brushes 51 are driven by an electric motor (not shown) through a friction clutch having a drive member (not shown) and a driven member 71. Driven member 71 is held from rotation by a projection 73 on lever 75 seated in a notch in the periphery of member 71. A push key 76 is provided for disengaging lever 75 from clutch member 71. A cam 77 and the brush shaft are fastened to clutch member 71 to advance a ratchet wheel 79 through lever 80 and pawl 82, one tooth upon each revolution of cam 77 and the brush shaft. Ratchet wheel 79 is provided with eleven teeth so that it completes one revolution during a complete scanning of the keyboard assembly. A projection 84 is provided on the hub of ratchet wheel 79 for the purpose of actuating lever 86 during the final transmission cycle. This projection releases lever 75 and permits its projection to enter the notch in clutch member 71, thereby holding the brushes from rotating after a transmission has been completed.

Depressing pushbutton 76 removes the projection 73 on lever 75 from the notch in clutch member 71, closes contacts 88 and opens contacts 89. The notched end of lever 75 hooks under the nose of lever 86 freeing member 71 to rotate brushes 51 over the faceplate of distributor 50.

Since segments "S" and "L" are grounded at the faceplate and three of segments (1)–(6) depending on the coded signal are also grounded at switches 25 or 31–36, then segment "T" connects to ground and establishes a marking condition on the tone keyer as the brushes pass over segments "S" and (1)–(6) and also establishes a circuit from plus through magnet 68, segments "L" and (7) to ground thus advancing stepping switch 30 across to the second position.

During each revolution of the brush shaft, ratchet wheel 79 is advanced one tooth until eleven transmissions have been made at which time projection 84 swings lever 86 outward, momentarily actuating switch 91 transferring plus potential from connection 92 from relay 48 to the "acknowledgment" conditioner circuit via connection 93, the effect of which will be described in greater detail hereinafter. The projection 73 on lever 75 then re-enters the notch in clutch disc 71 and prevents further rotation of the brushes. If, for any cause whatever, stepping switch 30 fails to fully advance so that contacts 94 remain closed at the termination of eleven revolutions of the distributor brushes, then a self interrupting circuit is established from plus through magnet 68 thence contacts 96 and 94 to ground until the cam follower of contacts 94 enters the notch in cam 98.

In the interests of convenience and efficiency, provision is made for transmitting the "manual acknowledgment" request signal by a separate push button 101. Push buttons 101 and 76 are mechanically inter-linked so that when button 101 is operated, button 76 is also depressed in the normal manner and transmission is initiated. When button 101 is operated, a circuit is closed through the coil of relay 48 and contacts 103 causing relay 48 to operate and lock up through contact 105. Contacts 46 on relay 48 then open the common circuit to the keyboard and also to the clear-out bank on stepping switch 30 so that station selecting signals and an acknowledgment request are the only signals which can be transmitted.

While a particularly adaptable electro-mechanical arrangement is shown in Fig. 3, it should be understood that the functions of a device according to the invention may be conveniently realized in other ways. For example, push buttons 76 and 101 may operate multi-contact switches, some of the contacts of which are interconnected and some of the contacts of which are connected to magnetic means for shifting lever 75 as required.

Thus far the control station apparatus for setting up and transmitting messages and acknowledgment requests to a remote station has been described and attention is now directed to the lower portion of Fig. 2 of the drawing showing in functional form the essential apparatus required for a remote station 110 according to the invention.

*Remote station system*

As in the case of the control equipment, the remote equipment is designed to operate in conjunction with already existing radio communication equipment. Audio-modulated radio-frequency signals received from a control station by a conventional receiver 112 are demodulated to produce two audio frequency tones and applied to the input circuit of an amplifier-rectifier circuit 114 preferably of the type shown and described in copending U.S. application Serial No. 643,094 filed January 24, 1946 and issued on January 9, 1951 as U.S. Patent 2,537,163 to E. R. Shenk and A. E. Canfora, which converts the audio-frequency signals into a series of D.-C. pulses which are applied by means of a receiving distributor 116 to a translator 118. In some instances circuit 114 will be incorporated into the receiver 112, as for example in the receiver shown and described in the co-pending U.S. patent application of R. E. Schock et al., Serial No. 632,978, filed December 5, 1945 and issued July 18, 1950 as U.S. Patent 2,515,668. Translater 118 mechanically decodes the electrical pulses and determines whether the message is intended for the particular remote station. If the station number of the equipment is selected, translator 118 translates the message into a form suitable for actuating a display unit 120. When a message has been correctly received, translator 118 through the intermediary of distributor 116 causes an acknowledgement unit 122 to generate an audio-frequency acknowledgement signal. This signal is applied to a conventional transmitter 124, which is automatically energized by the equipment. If an incorrect message is received, an indication of error appears on display unit 120 and an error-acknowledgment signal is generated and transmitted.

Figure 4:
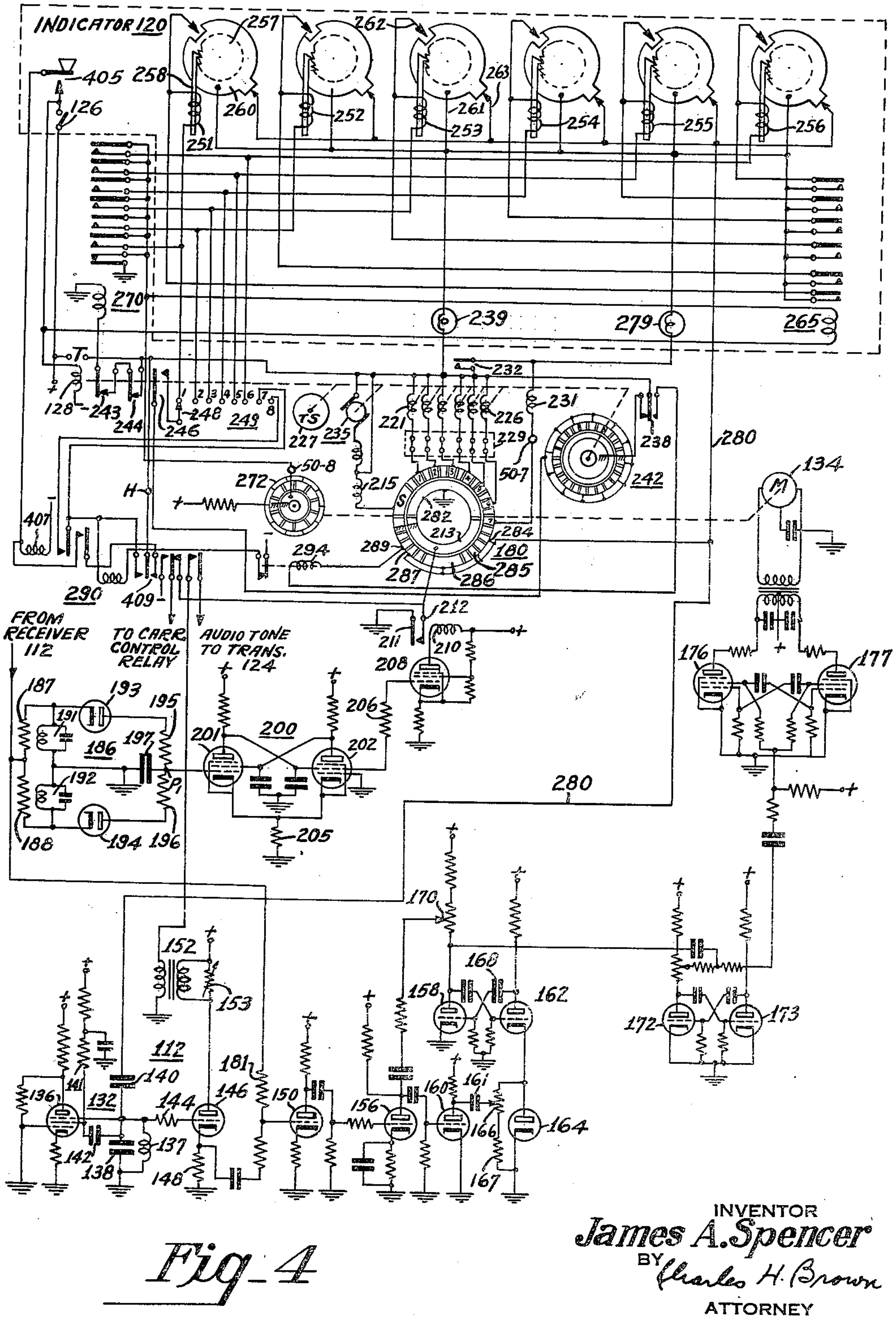
Fig. 4 is a schematic diagram of the arrangement of certain components of the remote station shown in Fig. 2.

Referring to Fig. 4, there is shown in schematic form the essential equipment of an embodiment of a remote station according to the invention.

*Synchronizing circuit*

The equipment is energized when a power switch 126 is closed to energize a power relay 128 in the power circuit. The distributor motor operates on 50-cycle/second current obtained from the output of a multivibrator chain, which is synchronized either by the incoming signal in the manner described and illustrated in U.S. Patent 2,483,786 issued October 4, 1949 to E. R. Shenk or the output of a local oscillator 132.

When no signal is being received, the multivibrator chain is synchronized by the output of the local oscillator 132, which is also used to generate a wave used in forming the acknowledgment signal as will be described hereinafter. The output of the multivibrator chain drives the distributor motor 134 at approximately, but not necessarily exactly, the same speed as the similar distributor motor at the control station.

Acknowledgment oscillator 132 consists of a pentode vacuum tube 136 operating as a transitron oscillator at 1200 cycles per second. The frequency of oscillation is determined by the tuned circuit consisting of inductor 137 and capacitor 138 connected between the suppressor grid of tube 136 and ground. A capacitor 140 is connected in parallel with capacitor 138 under certain circumstances to reduce the frequency of oscillation to 900 cycles per second, as will be explained hereinafter in connection with the function of the error relay. The transitron oscillator operates according to one plausible explanation by virtue of the negative transconductance between the suppressor and screen grids; that is, the more negative the suppressor becomes, the more current is drawn by the screen grid. A negative charge on the suppressor grid reduces the electron stream to the anode and increases the space charge between the suppressor and screen grids. This increases the supply of electrons available to the screen grid. The increased current through the screen grid resistor 141 reduces the screen grid voltage, so that the in-phase feedback from the screen grid to the suppressor grid through the capacitor 142 sustains oscillation.

The output of oscillator 132 preferably is amplified before synchronizing the multivibrator chain. The first stage is used for the output of the acknowledgment oscillator only, while the other three stages amplify all signals fed to the multivibrators.

The voltage across the tuned circuit 137, 138 of the oscillator is applied through a resistor 144 to the grid of an amplifier triode 146. This amplifier stage has two output circuits: the cathode-follower output and the anode-transformer output.

The output voltage across the cathode resistor 148 is applied to the grid of an amplifier triode 150. This voltage is high enough to synchronize the multivibrator chain, yet low enough to be overridden by any incoming signal.

The signal from the cathode of tube 146 is applied to the grid of tube 150 where it is amplified and applied to the grid of a limiting-amplifier triode 156. The output of tube 156 is applied to the anode circuit of a multivibrator triode 158. The output of tube 156 is also applied to the grid of the limiting-amplifier triode 160. The output of tube 160, which is 180 degrees out of phase with the output of tube 156, is applied through a capacitor 161 to the cathode circuit of the multivibrator triode 162. Triodes 158, 162 constitute the first stage in the multivibrator chain.

A multivibrator may be thought of as an oscillator consisting of two amplifier tubes having the anodes and grids resistance-capacity cross-coupled. When one tube is conducting the other is blocked. The natural frequency of a multivibrator depends primarily on the time required for the anode-to-grid coupling capacitor to discharge through the grid return resistor of the non-conducting tube. When one tube begins to conduct, the resulting reduction in anode potential is applied as a negative pulse through the anode-to-grid coupling capacitor to the grid of the opposite tube. The second tube is blocked until the coupling capacitor discharges to the cut-off potential of the control grid. Thereupon this tube begins to conduct and the first tube is blocked. An important characteristic of a multivibrator oscillator is that it may be synchronized by a frequency that is higher than its own natural frequency. For this reason multivibrators are used to reduce a frequency of either 1200 or 900 cycles to 50 cycles per second.

The first stage of the multivibrator chain consists of the two triodes 158, 162. When the triode section 162 is conducting, a diode 164 bypasses resistors 166 and 167 in the cathode circuit of tube 162 and prevents the cathode from going positive. For a multivibrator to be synchronized, a positive synchronizing pulse must reach the grid of the nonconducting tube at a time when the potential of the grid is sufficiently close to cut-off that the amplitude of the synchronizing pulse will raise the grid above cut-off. Thus each tube counts the number of positive pulses reaching its grid during the time it is not conducting. However, a positive pulse applied directly to the grid would be short-circuited to ground through the grid-to-anode coupling capacitor and the conducting anode of the opposite tube.

Synchronizing pulses from amplifier tube 156 are applied to the anode circuit of the multivibrator triode 158. These pulses are both positive and negative and are applied both while tube 158 is conducting and while it is blocked.

Both positive and negative pulses applied to the anode circuit of tube 158 while it is conducting are short-circuited to ground by the low anode resistance of the conducting triode.

Positive pulses applied to the anode of tube 158 while it is not conducting are coupled to the grid of tube 162, which is conducting. These positive pulses on the grid are short-circuited to the ground through the cathode of tube 162 and the rectifier 164. However, when negative pulses are applied to the anode of tube 158 and coupled to the grid of tube 162, a reduction in anode current is effected in tube 162. This results in an increase in anode potential, which is coupled through a capacitor 168 as a positive pulse on the grid of tube 158. If the grid of tube 158 is sufficiently close to cut-off, the tube will conduct and will block tube 162. Therefore, tube 158 counts the negative pulses from the amplifier 156 while tube 158 is not conducting.

Both positive and negative synchronizing pulses from amplifier 160 are applied to the cathode circuit of the multivibrator triode 162 while conducting and while blocked.

Both positive and negative pulses applied to the cathode of tube 162 while it is conducting are short-circuited to ground through rectifier 164.

Positive pulses applied to the cathode of tube 162 while it is not conducting are also short-circuited to ground through rectifier 164. Negative pulses, however, cause the cathode to go negative. This has the same effect as a positive pulse on the grid of tube 162, and the tube will start to conduct if the grid is sufficiently near the cut-off potential. Therefore, tube 162 counts the negative pulses from the amplifier 160 received while tube 162 is not conducting.

Triode 162 is fired by a negative pulse from tube 160 after having previously been cut off by a negative pulse from tube 156 which fired tube 158. Since the amplifier triodes 156 and 160 are 180 degrees out of phase, triode 162 counts an odd number of half cycles during the time it is cut off. Similarly, triode 158 also counts an odd number of half cycles while it is cut off. The circuit constants are chosen so that triode 158 counts three half cycles of either a 1200 or 900 cycle signal while it is not conducting and triode 162 counts five half cycles of a 900-cycle signal while it is not conducting. Therefore, the division factor of the first multivibrator stage is four for a 1200-cycle signal and three for a 900-cycle signal, and the output of this stage is 300 cycles for either input frequency. Resistors 166 and 170 are preferably variable as shown in order that the synchronizing pulses at the cathode of tube 162 and the anode of tube 158 may be adjusted to the proper amplitude to achieve these division factors.

The second multivibrator stage consists of the triodes 172 and 173. A 300-cycle in-phase synchronizing frequency is applied to the anode circuits of both of these triodes. Synchronization is thus similar to that for tube 158 in the first multivibrator stage. Since both tubes 172 and 173 are synchronized by an in-phase signal, each triode counts an even number of half cycles. The circuit constants of this stage are chosen so that tube 172 counts four half cycles of a 300-cycle signal and tube 173 counts two half cycles. Therefore, the division factor of this stage is three, and the output is 100 cycles per second.

The third multivibrator stage is a power-output stage consisting of the pentodes 176 and 177. The circuit is similar to the first two multivibrator stages, except that each feed-back circuit is from the screen grid of one tube to the control grid of the other. Both tubes are synchronized by an in-phase frequency applied to the screen grid circuits. Each tube counts two half-cycles while it is not conducting. The division factor of this stage is therefore two, and the output frequency is 50 cycles per second. The output of this stage is used to power synchronous motor 134 forming a part of distributor 180. Thus the speed of motor 134 depends on the frequency of the local oscillator when no signal is being received, and motor 134 rotates at approximately the same speed as the similar motor in the distributor portion of the control station equipment.

When a message is received, the demodulated 900-c./s. and 1200-c./s. signals from receiver 112 are applied preferably through the intermediary of a band pass filter and a limiting amplifier (not shown) having a square-wave output, which is applied through a resistor 181 to the grid of the amplifier triode 150. The incoming signal overrides the output of the local oscillator to synchronize the multivibrator chain and the output of the multivibrator chain now drives synchronous motor 134 at exactly the same speed as the distributor motor in the control station equipment.

Although the synchronous motors in both the control and remote station equipment rotate at the same speed, the gear reductions are slightly different, so that the remote station distributor completes its cycle and stops momentarily before the control station distributor starts its new cycle. This feature is designed to insure proper synchronization for each signal group of the message.

*Discriminator circuit*

The 900- or 1200-c/s. output of the band pass filter and square wave amplifier is also applied to a discriminator circuit 186 comprising input resistors 187 and 188, the parallel resonant circuits 191 and 192, diodes 193 and 194, load resistors 195 and 196, and a filter capacitor 197. Circuit 191 is tuned to 900 cycles per second, and circuit 192 is tuned to 1200 cycles per second. The output of the discriminator circuit is the junction point of load resistors 195, 196. When no signal is applied to the discriminator circuit, point $P_1$ is at ground potential. When a 900-c./s. mark signal is received, an A.-C. voltage appears across circuit 191. This signal voltage is rectified by both diodes 193 and 194, and a filtered D.-C. current flows through resistors 195 and 196. A negative D.-C. potential is developed at point $P_1$ because the anode of diode 194 is effectively grounded through circuit 192 for 900-c./s. A 1200-c./s. space signal appears across tuned circuit 192, and the point $P_1$ becomes positive with respect to ground. Therefore, the point $P_1$ is negative for mark and positive for space elements.

The output of discriminator 186 is applied to a locking (or switching) circuit 200 consisting of pentodes 201 and 202. These tubes are so connected that when either tube conducts, the other is cut off, and each tube is locked in its conducting or non-conducting condition until an external signal disturbs the equilibrium. The screen grid of each tube is connected to the anode of the other tube. The control grid of tube 201 is connected to the output of discriminator 186; the control grid of tube 202 is grounded. The cathodes of both tubes are connected to a common biasing resistor 205. When no signal is being received, tube 201 conducts and tube 202 is blocked. When a mark frequency signal is received, a negative potential is applied by discriminator 186 to the control grid of tube 201, to block the same, and cause an increase in anode voltage. This increased voltage applied to the screen grid of the tube 202 causes the latter to conduct. The decreased anode voltage of tube 202 is applied to the screen grid of tube 201, insuring that tube 201 remains blocked. A space frequency signal causes a positive potential to be applied by discriminator 186 to the control grid of tube 201. This positive signal causes tube 201 to conduct. The decreased plate voltage of tube 201 is applied to the screen grid of tube 202, blocking the latter tube. Thus the anode of tube 201 becomes more positive for mark and less positive for space signal elements.

The screen grid of triode 202 in locking circuit 200 is connected through a resistor 206 to the grid of a D.-C. amplifier tube 208. Cathode bias is sufficient to cut off tube 208 when the anode of tube 201 is drawing current. When tube 201 is cut off by a mark signal, the resulting rise in the anode potential of tube 201 is applied to the grid of tube 208, causing the tube to conduct. A relay 210 in the anode circuit of tube 208 is thus energized by a mark frequency and de-energized by a space frequency. One contact 211 of relay 210 is connected to ground, and the other contact 212 is connected to one of segments 213 of distributor 180.

Distributor 180 is the connecting link between the electronic and the electromechanical portion of the remote station apparatus.

*Receiving distributor*

Receiving distributor 180 consists of two concentric metal rings mounted on an insulating base and traversed by brushes electrically connected together. The rings are segmented as shown in Fig. 4 to suit the code employed in a manner well known in the art. One half of each ring is employed to receive intelligence impulses and the second half to transmit acknowledgment signals. The brushes are held from rotation by means of a latch fixed to the armature of the start magnet 215. This latch holds the driven clutch member and brushes stationary, causing the clutch to slip until start magnet 215 is energized.

The first element of every signal group is a mark. This initial mark energizes relay 210 causing segment 213 of the lower contact ring to be grounded. The rotor, which is in contact with segment 213 and with the start segment in the upper ring, grounds the start segment. When the start segment is grounded, start magnet 215 is energized, releasing the latch and permitting the friction clutch to drive the rotor. Magnet 215 is de-energized as soon as the upper brush leaves the start magnet, but the rotor continues to rotate until it has completed one revolution and a projection on the upper clutch disk strikes the latch of start magnet 215.

During the following six elements of the signal group, the upper brush of the rotor sweeps segments (1) through (6) while the lower brush continues to sweep segment 213. Thus for every mark signal element, the corresponding segment in the upper ring is grounded, and for every space signal element, the corresponding segment remains ungrounded. Each segment in the upper ring is connected to one of selector magnets 221 through 226 in a teleselector 227, one of these magnets being energized for each mark. In a normal signal group three of these magnets are energized and three remain unenergized.

Selector magnets 221–226 are energized through a coding plug 229. Coding plug 229 must be wired exactly the same as a similar plug 67 in the control station in order to unscramble the sequence in which the marks and spaces are received. There are 720 possible combinations in which the coding plug may be wired, including the straight through combination shown.

*Translator unit*

Teleselector 227, which is the electro-mechanical section of translator 118, comprises a selecting mechanism and a control mechanism. The selecting mechanism changes the D.-C. pulses received from distributor 180 through the intermediary of magnets 221–226 into mechanical movement, which is transmitted by two shafts, an index shaft and a cam shaft, to the control section. The control section of the teleselector contains a station-selecting mechanism, which determines whether the message is intended for the particular remote station. If so, the control mechanism transmits new data to display unit or indicator 120.

The translator consists of seven concentric metal disks or rings rotatably mounted in a metal frame, six being code rings and the seventh being a reset ring. The arrangement is basically the same as that disclosed in U.S. Patents 2,375,828 and 2,406,044, issued May 5, 1945, and August 20, 1946, respectively, to J. A. Spencer and L. F. Rheinhold, although certain mechanical improvements to be described are preferably employed. The peripheries of the discs are so notched that a channel is formed across their edges by angularly displacing any three disks. The location of the channel thus formed is dependent upon the particular group of three disks displaced.

A plurality of vanes are hinged around the circumference of the disk assembly, so that their ends fall into notches developed by the movement or displacement of the disks. The end of each vane is provided with a lug which interferes with the rotation of an exploring member mounted on the index shaft whenever the vane occupies an operated or selected position.

Following the six elements in the first subinterval of a signal group, a release magnet 231 is grounded through segment (7) of the upper contact ring and the permanently grounded segment in the lower contact ring of distributor 180. Release magnet 231 is energized if switch 232 is closed; that is, if any of selector magnets 221—226 have been energized.

The location of a channel on the circumference of the code-ring assembly depends on which of the three code rings or disks are moved. If more or less than three code rings or disks are moved, no channel is formed.

The selecting mechanism thus translates the D.-C. pulses obtained at distributor 180 into the complete revolution of the camshaft and the interrupted rotation of the index shaft. The point at which the rotation of the index shaft is interrupted depends on the relative times at which the three mark elements are received. If only the initial mark element of a signal train is received, as in the second clearout signal group, the distributor rotates once and no action takes place in the selecting mechanism.

If a false signal group, consisting of more or less than three marks following the initial mark, is received, one or more selector magnets are energized. In this event the release-magnet switch 232 is closed, the release magnet is energized when segment (7) is grounded, and the camshaft and the index shaft begin to rotate. However, since no channel is found on the circumference of the code-ring assembly, the rotation of the index shaft is in effect not interrupted until it reaches its original setting. During each normal signal reception the camshaft rotates completely, while the rotation of the index shaft is interrupted at some point in its cycle. The function of the control mechanism is to interpret the angles at which these interruptions occur.

The station selecting mechanism consists of three code disks mounted on the index shaft; two lever assemblies; a cam assembly mounted on the camshaft; and a locking cam. Basically the arrangement is that described and illustrated in U.S. Patent 2,404,814 issued July 30, 1946 to J. A. Spencer and L. F. Rheinhold, although certain improvements are preferably added as may be indicated hereinafter.

Each code disk has a projection which during station selection is lined up opposite the lower end of a corresponding lever assembly. The position of two of the code disks with respect to the third code disk which is the all station selection disk determines the station number assigned to or the identity of the particular equipment. A projection on the all station disk performs the same function for all station signals as the projection on the selector disk does for the individual station.

If both station selection signal groups correspond with the setting of the station selector, the projection on the code disks are aligned with the lower end of the station-selector levers, and the surface of the locking cam is engaged by an advance pawl to rotate still farther to the station-in position.

When the station-selector-locking cam is rotated into the station-in position, the locking surface of the cam is engaged by a station-selector-arresting lever, which is adapted to hold the locking cam in the station-in position and actuate a station-selector-arresting lever, which is adapted to hold the locking cam in the station-in position and actuate a station-selector switch 238 to change from the "out" to the "in" position; and also causes a "busy" lamp 239 to light to indicate that signals are being accepted by the selected remote station.

It should be understood that while the above-described mechanical arrangement of station selector is preferred for reasons of simplicity and convenience, the arrangement of the invention does not preclude the use of other embodiments of station selection apparatus, and other embodiments may be used with equal facility. An example of an excellent mechanism utilizing both mechanical and electronic principles on the basis of which to provide a station selector is to be found in U.S. Patent 2,497,936 issued February 21, 1950 to J. L. Finch. It should be obvious to one skilled in the art that the arrangement of the latter patent as adapted to the purpose of the subject communication system would have but two sets of cams; one for all station calls and one, preferably adjustable in nature, for individual station response.

*Display unit*

Since, as hereinbefore stated, rotation of the index shaft of the teleselector is a function of the intelligence to be displayed on the indicator or display unit 120, it is convenient in some instances to mechanically couple the teleselector and indicator together in one housing as described and illustrated in U.S. Patent 2,440,118 issued April 20, 1948 to J. A. Spencer and L. F. Rheinhold. In other circumstances, however, it is necessary that indicator 120 be located at some distance from the remainder of the equipment, in which case some pulse-stepping arrangement as shown in Fig. 4 is preferred. The control mechanism as described above is now in condition to receive code signals and accordingly transmit a series of pulses which will cause the existing display on indicator 120 to be cleared out, and subsequently to set up the new display on indicator 120.

Motor 235 supplies operating power to teleselector unit 227 through a gear train which drives an indexing arm through a friction clutch and an operating cam shaft through a toothed clutch. A commutator 242 is fastened to the indexing shaft and furnishes impulses for setting the display drums of indicator 120.

Cams for operating clearout contacts 243 and 244 together with transfer contact 246 are also located on the cam shaft. Normally open contacts 244 are closed by means of a lever selectively controlled by the teleselector. Contacts 243 are tensioned to close, and are opened by a cam immediately following the start of an operating cycle.

A switch-arm 248 is actuated by a cam and lever associated with the operating cam shaft; it is returned to its homing position only in response to a received code group of specific formation.

Station selector switch 238 is operated only upon completion of a station selection and remains operated until after the transmission of acknowledgment signals.

Indicator 120 contains six indicator drums (not shown) and six corresponding electromagnets or solenoids 251–256 which operate the drums. Eleven ideograms and an error symbol are printed on the circumference of each drum. A 12-tooth ratchet wheel 257 that is engaged by a pawl 258 on the solenoid armature is mounted on one side of each drum. A commutator 260 is mounted on the other side of each drum. Three brushes 261–263 make contact with each commutator. Brush 261 is connected to ground and makes contact with commutator 260 in every position of the drum. Brush 262 is connected to one side of the corresponding solenoid coil and to one of the contacts of a relay 265. This brush makes contact with the commutator for every position of the indicator drum except the error position. Therefore each solenoid is grounded through the corresponding two brushes except when the associated drum is in the error position. When relay 265 is energized, all of solenoids 251–256 are grounded, regardless of the position of their respective drums. The third brush 263 makes contact with the commutator only when the indicator drum is in the error position. Therefore, the error circuit will be grounded when any of the six drums is in the error position. Each time one of the solenoids 251–256 is energized and deenergized, its indicator drum advances one position. A relay 270 is mounted in the housing of indicator 120 and when energized grounds all of the indicator solenoids 251–256.

Assuming that a correct message has previously been received, the indicator-disk commutators 260 will not normally be in the error position. When the eleven signal groups of a normal message are processed by translator 227 as hereinbefore described, the resulting D.-C. pulses act on indicator 120 in the following manner.

When switch 232 of teleselector 227 is closed, a red "transmitting" lamp 279 is lighted to indicate that the control station is in communication with any one remote station, but not necessarily the subject station.

If the equipment is selected, a green "busy" lamp 239 lights when station-selector switch 238 changes from the "out" to the "in" position. Lamp 239 remains lighted until the completion of the message. The action of switch 238 also applies power to switches 243 and 244.

In response to reception of the clearout signal code group, the ratchet-operated stepping switch arm 248 is returned by a spring from position (8) to position (1), and at the same time switch 243 is closed. Switch 243, which is connected to the power line through the closed contacts of the switches 244 and 238, applies power to the clear-out relay 270.

Reset relay 265 is energized intermittently by a reset commutator 272 on distributor 180. Reset commutator 272 rotates continuously, intermittently energizing the coil of relay 265. Each time the relay is energized it also applies a positive pulse to six of the normally open contacts of clear-out relay 270.

Clear-out relay 270, when energized, breaks the ground connection to the relay 265 in the indicator, de-energizing relay 265. Relay 265, when de-energized, breaks the ground connection to one side of indicator solenoids 251–256. At the same time relay 270 connects the other side of all the solenoid coil winding in parallel to the positive pulses from reset commutator 272. These positive pulses energize all of the indicator solenoids 251–256 intermittently, to step the indicator drums around toward the error, or home, position. When each indicator drum reaches the home position, its solenoid is no longer energized, because relay 265 is de-energized and the drum commutator 260 breaks the remaining ground connection to the associated solenoid.

The time remaining during the first clear-out signal group after the series of actions described above may not be sufficient to step all of the indicator drums around to their home positions during the first clear-out signal group. The time required to bring each drum to the home position depends on its position in the previous message. The second clear-out signal group consists only of the initial mark. This causes the distributor rotor to make one revolution, but no mechanical action takes place in teleselector 227. Since the camshaft does not rotate, this signal group provides an additional time during which reset pulses are applied to the indicator solenoids, which insures that all indicator drums will be completely reset.

After the transfer-switch cam in the teleselector rotates through a small angle, switch 243 snaps from the clear-out to the indicator position. Switch 243 applies power from 244 to the pulsing commutator 242 and also opens the clear-out circuit to relays 265 and 270, de-energizing both relays. Relay 265 no longer applies positive pulses to the contacts of relay 270. Relay 270, when de-energized, removes the parallel connection from indicator solenoids 251–256 and at the same time applies ground to relay 265, energizing this relay. Relay 265 connects the other sides of all of the indicator solenoids to ground. Since the solenoids are now grounded, even though the indicator disks are in the error position, positive pulses applied to any solenoid will cause it to advance the corresponding indicator drum.

The index shaft begins to rotate a few degrees after the start of the camshaft cycle. As the index shaft rotates, the pulsing commutator 242 sends a series of pulses through stepping switch 249 to the indicator solenoid 251 which advances the indicator drum one step for each pulse. The number of pulses, and hence the ideogram displayed by the first indicator drum, depends on the angle at which rotation of the index shaft is interrupted.

If, for any reason, the first text group is a false signal group, that is, consists of more or less than three marks after the initial mark, no channel is set up on the circumference of the code-ring assembly of teleselector 227, and the index shaft continues to rotate through its cycle. During this period 12 pulses are applied to indicator solenoid 251 before the switch-on the teleselector 227 is opened. These 12 pulses step the indicator drum through one complete revolution, bringing the error symbol into view.

The operation of the translator and the indicator during the next five text groups is the same as during the first text group. After each ideogram is set up on the corresponding indicator drum, stepping switch 249 is moved to the next position. At the conclusion of the six message groups, the stepping switch is in position (7).

*Acknowledging unit*

The acknowledgment request signal group is processed by the selecting mechanism in the same manner as any other signal group. Each indicator drum assembly is provided with a contactor 263 arranged to cooperate with indicator commutator 260 connected to ground potential by brush 261. Contactors 263 are connected to the input of acknowledgment unit 112 via connection 280 so that when commutator 260 grounds brush 263, a long dash will be transmitted by the acknowledgment keyer.

Ring 282 of the faceplate of distributor 180 is grounded. Segments 284–287 are connected together, thence to the acknowledgment keyer 112 so that as the brushes traverse segments 284–287 a distinctive code signal is generated. As shown the code signal generated will be similar to the Morse code letter "F." However, it should be understood that any combination of pulses can be used and if desired an arrangement similar to coding plug 229 can be employed to permit changing the acknowledgment signal at will.

With switch-arm 248 positioned on point number 7, the next succeeding train of impulses operates an acknowledgment relay 290, completes a circuit to the carrier-control relay (not shown) to condition transmitter 124 for operation, connects audio tone obtained from tube 146 to the acknowledgment keyer and is locked in this condition through its own contacts and the normally closed contacts of cutout relay 294. The coil of relay 294 is open at switch 238 so that the brushes when traversing segment 289 of distributor 180 can not operate it. Ring 213 is then connected to ground through contacts of relay 290, thus supplying a start pulse to start magnet 215 to provide an added revolution of the brushes of distributor 180. During this added revolution, station switch 238 is mechanically transferred closing a circuit through the coil of relay 294 to segment 289. As the brushes traverse segments 284–287, the acknowledgment signal is transmitted, then as segment 289 is contacted, cut-out relay 294 is energized and the acknowledgment circuit restored to normal, leaving switch-arm 248 on position number 8.

As the brushes traverse the additional cycle described above, the output of the 1200-cycle acknowledgment oscillator 136 is applied to the input circuit of transmitter 124. When the upper brush sweeps the four acknowledgment segments 284–287 in the upper contact ring, capacitor 140 is grounded and the frequency of oscillator 136 is reduced to the 900-c./s. mark frequency. This causes the coded correct acknowledgment signal to be transmitted by transmitter 124.

The voltage at the anode of tube 146 is applied to the primary of a transformer 152. The amplitude of this signal is controlled by a variable resistor 153. The voltage across the secondary of transformer 152, which is used to modulate transmitter 124 when transmitting an acknowledgment signal, is applied to contacts of relay 290, which is energized only when an acknowledgment signal is being transmitted.

If one or more of the indicator drums is in the error position, capacitor 140 is then grounded continuously. In this event, the action of the equipment during and after the acknowledgment-request signal group is the same as that described above, except that an error-acknowledgment signal consisting of a continuous 900-cycle mark frequency is transmitted by the remote station equipment instead of the coded acknowledgment signal.

*Acknowledgment unit*

Referring to Fig. 3, the effect of the acknowledgment signal transmitted by the remote station transmitter 124 on the control station equipment will be described. As previously intimated, when push button 76 was operated to initiate transmission, contacts 90 closed to cause an acknowledgment indicator lamp 300 in the keyboard controller to light and when the acknowledgment unit accepts the acknowledgment signal it extinguishes acknowledgment indicator lamp 300. The circuit is so designed that the lamp will be extinguished only by a signal which is correctly coded and which is received during the relatively brief interval during which the acknowledgment signal is automatically transmitted by the remote station which receives the message originated by the control station.

Pentode tubes 301 and 302 are connected in a locking circuit. When one tube conducts the other is cut off. Normally unless a previous message has not been correctly acknowledged, tube 302 is conducting. The voltage drop across the anode resistor 304 keeps the anode voltage of tube 302 at a very low value. The screen grid of tube 301 is connected to the anode of tube 302 and the low voltage is sufficient to block tube 301. Conversely, the high voltage at the anode of the non-conducting tube 301 is applied to the screen grid of tube 302 and insures that it remain conducting. Acknowledgment indicator lamp 300 on the keyboard and a resistor 306 are connected between the negative power line and the anode of tube 302. While tube 302 conducts, lamp 300 remains unlighted. When a message is transmitted, and contacts 90 are closed, the screen grid of tube 302 and the anode of tube 301 are momentarily made negative to block tube 302. The resulting rise in voltage at the anode of tube 302 causes lamp 300 to light. After contacts 90 reopen, the high anode voltage of tube 302 applied to the screen grid of tube 301 maintains the latter conducting and the low anode voltage of tube 301 applied to the screen grid of tube 302 blocks the latter. Lamp 300 is kept lighted by this stable locking circuit. The lamp can be extinguished only by a negative pulse applied to the control grid of tube 301.

The acknowledgment signal from the remote station, consisting of alternate wave trains at 900 and 1200 c./s. enter acknowledgment unit 21 from receiver 23. The signal is applied to a discriminator circuit 310 through a band-pass filter as in the remote station equipment to improve the signal-to-noise ratio.

The acknowledgment signal enters discriminator circuit 310 through capacitor 308. Discriminator circuit 310 operates in known manner and may be a part of receiver 23 in many installations. Essentially, signal voltage appearing across tank circuit 311 resonant at 900 c./s. is rectified by diodes 313 and 314, making point $P_2$, common to resistors 315 and 316 negative with respect to point $P_3$, common to tank circuit 311 and 312. Similarly, signal voltage appearing across tank circuit 312 resonant at 1200 c./s. is rectified by diodes 313, 314, making point $P_2$ positive with respect to point $P_3$. If the signal voltages across the two tank circuits are equal, point $P_2$ will be at the same potential as point $P_3$. However, when a 900 c./s. mark signal is received, the voltage across tank circuit 311 is greater than that across tank circuit 312 and point $P_2$ is negative with respect to point $P_3$. When a 1200 c./s. space signal is received, point $P_2$ is positive with respect to point $P_3$. The potential of point $P_3$ is determined by the action of a gating trigger, which insures that the acknowledgment signal be received a predetermined limited time period in order that a response to a previous message cannot affect the communications. Further details of this portion of the circuit may be had by referring to U.S. Patent 2,537,163 issued January 9, 1951 to E. R. Shenk and A. E. Canfora. As previously mentioned, between the tenth and eleventh revolutions of the distributor 50 in the keyboard controller, switch 91 is operated momentarily, to apply a positive conditioning pulse to a D.-C. amplifier tube 321. Voltage divider resistors 323, 324 apply cathode bias blocking the flow of anode current until the conditioning pulse is applied as a positive signal on the grid of tube 321. For the duration of the conditioning pulse, anode current flows, causing a voltage drop across a resistor 326 and hence a negative voltage pulse, which is applied, through a capacitor 328 and resistor 329, to the grid of a tube 330.

Tubes 330 and 331 are connected as a time-delay trigger circuit which determines the limited time period in which the response must be obtained. Tube 330 normally conducts and the flow of anode current through a resistor 332 causes a voltage drop which places the grid of tube 331 at a potential highly negative with respect to ground, blocking tube 331. When the momentary negative pulse from tube 331 is applied to the grid of tube 330, anode current is sharply reduced or cut off. The change in anode current flow through resistor 332 raises the potential of the grid of tube 331 and the tube conducts. The reduction in voltage at the anode of tube 331 is applied as a second negative pulse to the grid of tube 330 through capacitor 328 and resistor 329, driving the grid well below cut-off. As capacitor 328 charges through the resistors 329 and 334, the potential of the grid of tube 330 gradually rises until the tube begins to conduct again. When tube 330 conducts, tube 331 is again cut off. As the anode current in tube 330 is increased from zero to full value, the corresponding change in potential at the anode of tube 330 constitutes a negative pulse, which is applied through a capacitor 336 and a resistor 338 to the grid of tube 340. The time interval between the conditioning pulse and the application of a negative pulse to tube 340 is determined by the value of capacitor 328 in association with resistors 329 and 334. This period is approximately equal to the time required for one revolution of distributor 50.

Tubes 340 and 341 are connected as a gating trigger. Before the negative pulse is applied to the grid of tube 341 from tube 330, plate current flows in tube 330, producing a voltage drop across a resistor 332, which makes the grid of tube 331 sufficiently negative to block anode current. The negative pulse from the time-delay circuit applied to the grid of tube 340, sets off a train of reactions similar to those occurring in the time-delay circuit of tubes 330 and 331, as described above. Tube 340 is blocked and tube 341 conducts until a capacitor 344 is charged through resistors 345, 338, 346, 347 and 348. Tube 340 is blocked during the period in which the acknowledgement signal is transmitted by the remote equipment.

The cathode of tube 340 is connected to point $P_3$ in discriminator 310. Therefore, when no signal is being received, the grid of tube 350, being connected to point $P_3$, through the diodes 313 and 314, is at the same potential as the cathode of tube 340. The cathode of 350 is less negative than —power terminal 352, because there is a voltage drop across resistor 353. The cathode of tube 340 is normally less negative than —power by an amount equal to the voltage drop across resistor 348. This voltage drop is considerably greater than the drop across resistor 353. Hence the grid of tube 350 is returned to a point that is positive with respect to the cathode, and the tube operates at anode saturation. Under these conditions the output of discriminator 310 does not affect the anode current of tube 350. However, during the time tube 340 is cut off, its cathode, and the grid of tube 350, are at the potential of —power terminal 352, in which case the grid of tube 350 is slightly negative with respect to the cathode. Positive or negative voltages coming from discriminator 310 now cause variation in the anode current of tube 350, and operate a locking circuit comprising tubes 350 and 351. Thus an acknowledgement signal can be processed by the acknowledgement unit only during the brief interval in which tube 340 is blocked.

Tubes 350 and 351 are pentodes connected in a locking circuit. Before a signal is applied from discriminator 310, anode current flows in tube 350 and tube 351 is blocked. When a correct acknowledgement signal is received, the output of discriminator 310 is positive at first, changing to negative when the first mark of the acknowledgement signal is received. This negative voltage, applied to the grid of tube 350, blocks the tube. When no anode current flows through resistor 356 the potential at the anode of tube 350 and the screen grid of tube 351 rises, causing tube 351 to conduct. When the acknowledgement signal changes back to a space, discrimination 310 applies a positive voltage to the grid of tube 350, which causes it to conduct again. The resultant anode current flow through resistor 356 lowers the screen grid potential of tube 351 sufficiently to block the tube. Thus, each time a space is received, tube 350 conducts and tube 351 does not; each time a mark is received, tube 351 conducts and 350 is cut off.

The grid of tube 360 is direct-coupled to the anode of tube 350. When tube 350 is blocked because of a change from space to mark in the acknowledgement signal, the grid of tube 360 becomes positive with respect to the cathode. When tube 350 becomes conductive because of a change from mark to space, the grid of tube 360 becomes negative with respect to the cathode, cutting the tube off. These changes in grid potential result in anode current changes which produce pulses as follows:

When acknowledgement signal changes from

| Pulse applied from | Space to mark (pulse) | Mark to space (pulse) |
|---|---|---|
| Tube 360 anode | − | + |
| Tube 360 cathode | + | − |
| Point $P_4$ | − | + |

At the time the acknowledgement signal is received, anode current is flowing in tube 362, the flow of anode current through resistor 395 rendereing the grid of 363 negative with respect to ground, and cutting off the tube.

The first mark in the acknowledgement signal results in the application of a negative pulse from the anode of D.-C. amplifier 360 through capacitor 366, diode 368, and resistor 369, to the cathode of tube 363 across resistor 371 and capacitor 372 shunted by a diode 374. The circuit constants are so arranged that the voltage thus applied to the cathode is not sufficient to cause tube 363 to conduct.

When the second space of the acknowledgement signal is received, a positive pulse is applied from the anode of tube 360 through capacitor 366 and resistor 376, to the anode of diode 377, the current flow through diode 377 and resistor 376 discharging capacitor 366.

At the second mark of the acknowledgement signal, another negative pulse is applied, as in the case of the first mark, to the cathode of tube 363. Because capacitor 372 is still charged as a result of the previous negative pulse, the cathode will be made more negative than previously. However, the cathode will still not be sufficiently negative to cause tube 363 to conduct.

The third space of the acknowledgement signal discharges capacitor 366, as did the second space.

When the third (long) mark is received, capacitor 372 has been charged to a sufficiently high potential, as a result of the first and second marks, so that the negative pulse applied to the cathode of tube 363 from the anode of tube 360 as a result of the third mark is sufficient to cause tube 363 to conduct. As in the case of tubes 330 and 331, when tube 363 conducts tube 362 is blocked.

If the first and second marks are not of sufficient duration, the capacitor 372 will not be charged sufficiently to permit tube 363 to conduct when the third mark is received. If the second and third spaces are not of sufficient duration, capacitor 366 will not be sufficiently discharged through the diode 377 and the resistor 376.

Up to this time tube 380 and therefore diode 383 have been conductive and tube 381 non-conductive, the grid of tube 381 being negative with respect to ground. When tube 363 becomes conductive, the resulting change of anode potential constitutes a negative voltage pulse, applied through a capacitor 386 and resistor 387 to the cathode of tube 381, across resistor 388 and capacitor 389.

The negative potential is applied gradually to the cathode of tube 381, which does not become sufficiently negative as a result of this charge to cause the tube to conduct. However, when the fourth space of the acknowledgement signal is received, capacitor 389 has been charged sufficiently during the long third mark, so that the negative pulse from the cathode of tube 360 through resistor 391 and capacitor 392 is sufficient to cause tube 381 to conduct. As in the case of tubes 330 and 331, when tube 381 is conducting, tube 380 is blocked.

It should be noted at this point that if a space is received at any point before capacitor 389 is charged sufficiently to permit the negative pulse from tube 360 to cause tube 381 to conduct (as might happen if a spurious acknowledgement signal were injected) a negative pulse will be applied from the cathode of tube 360 through a resistor 393, a capacitor 394 and a resistor 395 to the grid of tube 363. This will cut off tube 363, and by a reversal of the process of interaction between tubes 363 and 362 described above, tube 362 will conduct. The result of this change will be a positive pulse applied from the anode of tube 363 to the cathode of tube 381. If this happens, then tube 381 will not be made to conduct when the fourth space of the acknowledgement signal is received.

When the fourth mark is received, the negative pulse from point $P_4$ in the anode circuit of tube 360 is applied through a resistor 397 and a capacitor 398 to the relatively high-impedance circuit consisting of a resistor 399 and a non-conducting diode 400. The voltage applied across this parallel combination to the grid of tube 301 is sufficient to block the latter. When this tube is blocked, the increased anode voltage applied to the screen grid of tube 302 causes tube 302 to conduct, whereby the anode voltage falls below the extinction potential of lamp 300 and it is extinguished to indicate acknowledgment of a correctly received message. Any signal at all other than the specified acknowledgment signal is in effect an error signal. Furthermore, the proper signal will not be accepted after a predetermined time interval has elapsed.

Note that if tube 380 is not blocked before the fourth mark is received, the negative pulse from tube 360 is short-circuited by the low impedance of the conducting diode 400 and tube 301 is not blocked.

While the foregoing description of the acknowledgment circuit was predicated on the fixed acknowledgment signal previously described, it should be understood that the principles of the described arrangement can be applied by those skilled in the art to circuits for decoding other such acknowledgment signals in the manner required by the associated apparatus. For details of certain of the principles, reference should be made to the copending U.S. Patent application, Serial No. 625,084 filed October 27, 1945 and issued April 17, 1951 as U.S. Patent 2,549,022 to E. R. Shenk and A. E. Canfora.

*Supplementary acknowledging circuit*

Provision is made in the signalling system according to the invention for transmitting a signal from the remote station indicating compliance with or other pertinent information concerning terms of a previous message. In such a case the operator at the remote station, upon determining that a reply is in order, operates, a push button 405 conveniently located in indicator 120, referring to Fig. 4, to condition the remote station apparatus for reply.

Momentarily closing switch 405 applies a pulse of current to a manual acknowledgment relay 407, energizing the relay. Relay 407 remains locked in through its own contacts and normally closed contacts 409 of acknowledgment relay 290. The remote station now awaits interrogation by the control station.

At the control station the operator after waiting for a time after which he can expect a reply operates push button 101, referring now to Fig. 3, and thereby energizes the transmission circuits in the same manner as send switch 76, except that the six message switches 31–36 are excluded from the circuit. Switch contacts 103 also energizes holding relay 48, which locks itself in by means of contacts 105 and also opens the circuit from the message-unit ground circuit to the clear-out-request section, contacts 42–44, of stepping switch 30. The rotors of station selector switch 25 and the acknowledgment request section of stepping switch 30 remain grounded. The rotor of distributor 50 completes its 11-revolution cycle, but signal pulses (except for initial pulses) are transmitted only during the period assigned to the station-selection and acknowledgment-request groups. Between the 10th and 11th revolution of distributor 50 the switch 91 opens the circuit to holding relay 48.

The acknowledgment indicator lamp 300 is lighted in the normal manner in readiness to be extinguished by the acceptance of an acknowledgment signal as described hereinbefore.

Returning to Fig. 4, the remote station apparatus upon receipt of the manual acknowledgment request signal operates during the two station-selection signal groups as it does during a normal message. At the conclusion of the second station-selection signal group, the station-selector switch 238 in teleselector 227 transfers from "out" to "in." During the next eight signal groups the distributor makes eight revolutions, but no action takes place in teleselector 227.

The acknowledgment-request signal group is the same in this message as in the normal message. However, because there is no element signal group stepping switch 249 remains in position (8) during the entire message, and potential is applied by contacts of relay 407 to the coil of acknowledgment relay 290, which now functions in the normal manner hereinbefore described.

The receipt of the manual acknowledgment signal at the control station is exactly as for the automatic acknowledgment signal.

*Test apparatus*

In the course of actual operation it is desirable to be able to test the operation of certain components of the system, especially teleselector 227 and indicator 120. U.S. Patent 2,453,871, issued November 16, 1948 to J. A. Spencer describes and illustrates test apparatus suitable for this purpose. The contacts of test connection terminal board 50 of the arrangement shown in the sole figure of the patent are connected to the arrangement of Fig. 4 of the drawing in the instant application. Terminals 1–6 are connected to magnets 221–226 preferably at the terminals of code plug socket 229. Terminals 7 and 8 of the test apparatus are connected to terminals 50—7 and 50—8 respectively and the corresponding + and − terminals are interconnected. Some of the connections from the test equipment can be arranged to be plugged into the coding plug socket, if desired.

Although the invention is intended for use between stations connected by radio wave transmission circuits, the application thereof to wire lines and other intelligence transmission means is by no means precluded.

Also, while the invention has been described with reference to specific apparatus, it should be understood that the substitution of other apparatus and various modifications, especially as to number and location, of the described arrangements and those referred to will be suggested to those skilled in the art without departing from the spirit and scope of the invention.

The invention claimed is:

1. An automatic signalling system for communicating between a primary and a secondary station, including electric connections establishing electric current conditions corresponding to predetermined intelligence signals, a step-by-step device interposed in said connections to scan said connections in proper order, a distributing arrangement coupled to said step-by-step device to transmit said signals in proper order and time sequence, an electronic circuit arrangement having acknowledgment accepting and indicating portions, circuit connections interposed between said distributing arrangement and said electronic circuit arrangement to condition the latter in accordance with and in proper phase relationship to said transmission by said distributing arrangement to accept an acknowledgment signal, a tone signal source coupled to said distributor, means at said secondary station to receive said transmitted signals and convert the same into direct current pulses, a further distributing arrangement, a translating device having relatively displaceable elements, said further distributor being arranged to apply said direct current pulses to said translator device to convert said received tone signals into mechanical displacement of said relatively displaceable elements, an interrupter device adapted to be positioned in accordance with said relatively displaceable elements to produce a number of square wave pulses corresponding to said received tone signals, an indicating device arranged to translate said square wave pulses into visual indication of said received tone signals, transmitting apparatus at said secondary stationary adapted to transmit an acknowledgment signal to said primary station in response to correct operation of said indicator device, receiving apparatus at said primary station adapted to receive said acknowledgment signal, said electronic circuit arrangement being coupled to said receiving apparatus to indicate visually proper receipt of said acknowledgment signal.

2. An automatic signalling system for communicating between a primary and a secondary station, including an electric keyboard for establishing electric current conditions corresponding to predetermined intelligence signals comprising station identity and prepared text intelligence, fixed connections establishing electric current conditions corresponding to intelligence signals comprising clearout and acknowledgment request intelligence, a step-by-step device connected to said keyboard and interposed in said fixed connections to scan said keyboard and said fixed connections in proper order, a distributor coupled to said step-by-step device to transmit said signals in proper order and time sequence, an electronic circuit arrangement having acknowledgment accepting and indicating portions, circuit connections interposed between said distributor and said electronic circuit arrangement to condition the latter in accordance with and in proper phase relationship to said transmission by said distributor to accept an acknowledgment signal, a tone signal generator coupled to said distributor to impress keyed tone signals on said transmission circuit, means at said secondary station to receive said transmitted signals and convert the same into direct current pulses, a further distributor, a translating device having relatively displaceable elements, said further distributor being arranged to apply said direct current pulses to said translator device to convert said received tone signals into mechanical displacements of said relatively displaceable elements, an interrupter device adapted to be positioned in accordance with said relatively displaceable elements to produce a number of square wave pulses corresponding to said received tone signals, an indicator arranged to translate said square wave pulses into visual indication of said received tone signals, transmitting apparatus at said secondary station adapted to transmit an acknowledgment signal to said primary station in response to correct operation of said indicator device, receiving apparatus at said primary station adapted to receive said acknowledgment signal, said electronic circuit arrangement being coupled to said receiving apparatus to indicate visually proper receipt of said acknowledgment signal.

3. An automatic signalling system for communicating between a primary and a secondary station, including an electrical keyboard for establishing electric current conditions corresponding to intelligence signals comprising station identity and prepared text intelligence, fixed connections establishing electric current conditions corresponding to intelligence signals comprising clearout and acknowledgment request intelligence, a step-by-step device connected to said keyboard and interposed in said fixed connections to scan said keyboard and said fixed connections in proper order, a distributor coupled to said step-by-step device to transmit said signals in proper order and time sequence, an electronic circuit arrangement having acknowledgment accepting and indicating portions, circuit connections interposed between said distributor and said electronic circuit arrangement to condition the latter in accordance with and in proper phase relationship to said transmission by said distributor to accept an acknowledgment signal, a circuit arrangement coupled to said distributor for controlling the speed of rotation of said distributor, a tone signal generator coupled to said distributor to impress keyed tone signals on said transmission circuit, a counting device coupled to said distributor for ascertaining the number of revolutions of said distributor for each message to be transmitted, said counting device being arranged to reset said distributor, said keyboard and said step-by-step device to the initial position at the end of each transmission, means at said secondary station to receive said transmitted signals and convert the same into direct current pulses, a further distributor, a translator device having relatively displaceable output elements, an electronic circuit arrangement coupled to said receiving means and said distributor to cause the latter to rotate in synchronism with the received tone signals, said further distributor being arranged to apply said direct current pulses to said translator device to convert said received tone signals into mechanical displacements, an interrupter device adapted to be positioned in accordance with said relatively displaceable elements to produce a number of square wave pulses corresponding to said received tone signals, an indicator device arranged to translate said square wave pulses into visual indication of said received tone signals, transmitting apparatus at said remote location adapted to transmit an acknowledgment signal to said control station in response to correct operation of said indicator device, receiving apparatus at said control station adapted to receive said acknowledgment signal, said electronic circuit arrangement being coupled to said receiving apparatus to indicate visually proper receipt of said acknowledgment signal in accordance with said conditioning of said circuit arrangement.

4. An automatic signalling system for communication between a control station and a plurality of remote stations, including a remote station identity selecting circuit comprising a multi-contact selecting switch, a multi-section multi-contact switch bank, a multi-contact stepping switch, a bus system interconnecting contacts of said selecting switch and contacts of said switch bank with contacts of said stepping switch, a transmitting distributor having segments connected to the arms of said stepping switch, a motor driven mechanism arranged to control rotation of said distributor for a predetermined number of revolutions and actuation of said stepping switch, a manually actuated member coupled to said mechanism and arranged to initiate rotation of said distributor, means connected to said bus system to energize the segments of said transmitting distributor in accordance with the settings of said switches, means coupled to said distributor to transmit signals corresponding to the energized segments of said distributor to all of said remote stations, means located at said remote stations to receive said transmitted signals, a receiving distributor, connections applying elements of said received signals to said receiving distributor, a translating mechanism having rotatable members, said translating mechanism being coupled to said receiving distributor to translate said received signals into rotational displacements of said members corresponding to the intelligence conveyed, a commutator coupled to said translating mechanism to generate trains of square wave pulses corresponding to the intelligence conveyed by said received signals, an indicator device comprising a plurality of drums, each of said drums having a number of indicia thereon, and stepping motors associated with each of said drums to step the same in accordance with the train of square wave pulses applied, contacts closed in response to proper positioning of said drums and further contacts opened in response to proper positioning of said drums, relays coupled to said contacts, and a transmitter coupled to said relays to transmit an acknowledgment signal to said control station, a receiver at said control station to receive said transmitted acknowledgment signal, an electronic gating circuit coupled to said receiver and adapted to permit said acknowledgment signal to pass only within a predetermined time period, an electronic indicating circuit coupled to said gating circuit, said indicating circuit being conditioned to light a lamp on transmission of the first said signals by said control station, an electronic circuit interposed between said gating circuit and said electronic indicating circuit to extinguish said lamp upon recepit of a predetermined acknowledgment signal only.

5. An automatic signalling system for communication between a control station and a plurality of remote stations, including a remote station identity selecting circuit comprising a multi-contact selecting switch, a multi-section multi-contact switch bank, a multi-contact stepping switch, a bus system interconnecting contacts of said selecting switch and contacts of said switch bank with contacts of said stepping switch, a transmitting distributor having segments connected to the arms of said stepping switch, a motor driven mechanism arranged to control rotation of said distributor for a predetermined number of revolutions and actuation of said stepping switch, a manually actuated member coupled to said mechanism and arranged to initiate rotation of said distributor, means connected to said bus system to energize the segments of said transmitting distributor in accordance with the settings of said switches, means coupled to said distributor to transmit signals corresponding to the energized segments of said distributor to all of said remote stations, contacts coupled to said distributor to close a circuit upon completion of said transmission, means located at said remote stations to receive said transmitted signals, a receiving distributor, connecting applying elements of said received signals to said receiving distributor, a translating mechanism having rotatable members, said translating mechanism being coupled to said receiving distributor to translate said received signals into rotational displacements of said members corresponding to the intelligence conveyed, a commutator coupled to said translating mechanism to generate trains of square wave pulses corresponding to the intelligence conveyed by said received signals, a station selector mechanism coupled to said translating mechanism to condition said commutator for operation upon translation of predetermined identity signals an indicator device comprising a plurality of drums, each of said drums having a number of indicia thereon, and stepping motors associated with each of said drums to step the same in accordance with the train of square wave pulses applied, contacts closed in response to proper positioning of said drums and further contacts opened in response to proper positioning of said drums, relays coupled to said contacts, and a transmitter coupled to said relays to transmit an acknowledgment signal to said control station, a receiver at said control station to received said transmitted acknowledgment signal, an electronic gating circuit coupled to said receiver and adapted to permit said acknowledgment signal to pass only within a predetermined time period, said gating circuit being activated by closure of said contacts coupled to said distributor, an electronic indicating circuit coupled to said gating circuit, said indicating circuit being conditioned to light a lamp on transmission of the first said signals by said control station, an electronic circuit interposed between said gating circuit and said electronic indicating circuit to extinguish said lamp upon receipt of a predetermined acknowledgment signal only.

6. An automatic signalling system for communicating between a superior station and at least one of a possible plurality of subordinate stations, including means at said superior station to transmit a train of signal elements corresponding to prearranged signals including subordinate station identification, clearout, message text and acknowledgement request signals, means at said subordinate station to receive said transmitted signals, signal translating equipment responsive to the received signals, means responsive to predetermined station identification signals only to condition said signal translating equipment for translation of said clearout, message text and acknowledgement request signals, an indicator device actuating means coupled to said translating equipment and said indicator device to reset said indicator device to an initial position in response to the clearout signal, said actuating means being further effective to set said indicator device in accordance with said message text signals, means to transmit signals to said superior station, means to generate an acknowledgement signal, means coupling said generating means to said last-mentioned transmitting means to transmit said acknowledgement signal to said superior station in response to reception of said acknowledgement request signals, means incorporated in said indicator device to prevent transmission of said acknowledgement signal in response to mistranslation of said message text signals, and means at said superior station to receive and indicate said acknowledgement signal.

7. An automatic signalling system for communicating between a superior station and at least one of a possible plurality of subordinate stations, including at said superior station electric current carrying network having connections establishing electric current conditions corresponding to prearranged intelligence signals, means to select a number of said connections to formulate a message to be transmitted, means to scan said selected connections in predetermined order to produce current pulses corresponding to said message, transmitting apparatus, means to apply said pulses to said transmitting apparatus, to transmit a train of singal elements, receiving equipment arranged to receive said train of signal elements at said subordinate station, a translator device, distributing apparatus interposed between said receiving equipment and said translator device to apply said received signal elements to said translator device to convert the received signal elements into pulse trains of length corresponding to said intelligence signals, an indicator device having a plurality of indicating elements arranged to indicate said received intelligence signals in response to application of said variable length pulse trains, each of said indicating elements having electric contact structures associated therewith and arranged to be closed in one position only of said indicating elements, means to generate a given signal, transmitting equipment, an electric circuit arranged to be closed upon the closure of any one of said contact structures to apply said given signal to said transmitting equipment, receiving apparatus at said superior station to receive said given signal, an indicating device coupled to said receiving apparatus to indicate reception of a signal, other than said given signal and an electronic circuit arrangement interposed between said receiving apparatus and said indicating device to prevent the latter from indicating reception of signals other than said given signal in response to reception of said given signal.

8. An automatic signalling system for communicating between a superior station and at least one of a possible plurality of subordinate stations, including means at said superior station to transmit a train of signal elements corresponding to prearranged signals including subordinate station identification, clearout, message text and acknowledgement request signals, means at said subordinate station to receive said transmitted signals, signal translating equipment, means responsive to predetermined station identification only to condition said signal translating equipment for translation of said clearout, message text and acknowledgement request signals, an indicator device coupled to said translating equipment, actuating means interposed between said translating equipment and said indicator device to reset said indicator device to an initial position in response to translation of the clearout signal and to set said indicator device to display said message text in response to translation of said message text signals, generating means to produce an acknowledgement signal and an error signal, means to transmit signals to said superior station, means coupled to said translating equipment to apply said acknowledgement signal to said transmitting means to transmit said acknowledgement signal to said superior station in response to translation of said acknowledgement request signal, said actuating means being effective to reset said indicator device to said initial position in response to any mistranslation of said message text signals, means coupled to said indicator device to apply said error signal to said transmitting means to transmit said error signal to said superior station when said indicator device is positioned in the said initial position, and means at said superior station to receive and indicate said acknowledgement signal only in the absence of reception of said error signal.

9. An automatic signalling system for communicating between a superior station and at least one of a possible plurality of subordinate stations, including at said superior station electric current carrying network having connections establishing a plurality of electric current conditions corresponding to assigned intelligence signals, means to select a number of said connections to formulate a message to be transmitted, means to scan said selected connections in predetermined order to produce current pulses corresponding to said message, transmitting apparatus, means to apply said pulses to said transmitting apparatus to transmit a train of signal elements, receiving equipment arranged to receive said train of signal elements at said subordinate station, a translator device, distributing apparatus interposed between said receiving equipment and said translator device to apply said received signal elements to said translator device to convert the received signal elements into pulse trains of length corresponding to said intelligence signals, an indicator device arranged to indicate predetermined ones of said received signals visually in response to said variable length pulse trains, transmitting equipment, a generator arranged to generate a predetermined signal, an electric circuit arranged to be closed in response to a prearranged condition of said translator device to apply said predetermined signal to said transmitting equipment, further electric circuits arranged to be closed in response to mistranslation of said translator device to prevent application of said predetermined signal to said transmitting equipment, receiving apparatus at said superior station to receive said predetermined signal, and an indicating device coupled to said receiving apparatus to indicate visually reception of said predetermined signal only.

10. An automatic signalling system for communicating between a superior station and at least one of a possible plurality of subordinate stations, including at said superior station electric current carrying network having connections establishing electric current conditions corresponding to prearranged intelligence signals, means to select a number of said connections to formulate a message to be transmitted, means to scan said selected connections in predetermined order to produce current pulses corresponding to said message, transmitting apparatus, means to apply said pulses to said transmitting apparatus, to transmit a train of signal elements, receiving equipment arranged to receive said train of signal elements at said subordinate station, a translator device, distributing apparatus interposed between said receiving equipment and said translator device to apply said received signal elements to said translator device to convert the received signal elements into pulse trains of length corresponding to said intelligence signals, an indicator device having a plurality of indicating elements arranged to indicate said received intelligence signals in response to application of said variable length pulse trains, each of said indicating elements having electric contact structures associated therewith and arranged to be closed only in an error position of said indicating elements, transmitting equipment, means to continuously generate a given signal, keying means responsive to said translator device to apply said continuously generated given signal intermittently to said transmitting equipment, an electric circuit arranged to be closed upon the closure of any one of said contact structures to apply said given signal continuously to said transmitting equipment, receiving apparatus at said superior station to receive said given signal, an indicating device coupled to said receiving apparatus, and an electronic circuit arrangement interposed between said receiving apparatus and said indicating device to indicate the reception of said intermittently transmitted signal only in the absence of reception of said continuously transmitted given signal.

References Cited in the file of this patent

UNITED STATES PATENTS

| | | |
|---|---|---|
| 2,121,163 | Robinson | June 21, 1938 |
| 2,354,534 | Mason | July 25, 1944 |
| 2,456,226 | Thorpe | Dec. 14, 1948 |
| 2,495,705 | Devaux | Jan. 31, 1950 |